(12) United States Patent
Hinei et al.

(10) Patent No.: US 6,384,371 B1
(45) Date of Patent: May 7, 2002

(54) LASER BEAM MACHINING APPARATUS

(75) Inventors: Ryo Hinei, Fujiyoshida; Masaaki Uematu, Koufu; Kuniyasu Matsumoto; Kenichiro Abe, both of Yamanashi, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/414,546

(22) Filed: Oct. 8, 1999

(30) Foreign Application Priority Data

Oct. 15, 1998 (JP) .......................................... 10-307801

(51) Int. Cl.$^7$ ............................................. B23K 26/08
(52) U.S. Cl. ........................... 219/121.78; 219/121.65; 219/121.67; 219/121.68; 219/121.7; 219/121.81; 219/121.79
(58) Field of Search ....................... 219/121.65, 121.67, 219/121.68, 121.7, 121.78, 121.79, 121.8, 121.81

(56) References Cited

U.S. PATENT DOCUMENTS

| | | | | |
|---|---|---|---|---|
| 4,174,154 A | * | 11/1979 | Kawasaki | ................... 359/861 |
| 5,130,854 A | * | 7/1992 | Suzuki | ....................... 359/823 |
| 5,450,386 A | * | 9/1995 | Date | ........................ 369/44.14 |
| 5,463,612 A | * | 10/1995 | Date | .......................... 369/219 |
| 6,163,373 A | * | 12/2000 | Ohtomo et al. | ............. 356/147 |

FOREIGN PATENT DOCUMENTS

| | | | | |
|---|---|---|---|---|
| JP | 50-144392 | 5/1949 | | |
| JP | 57132113 A | 8/1982 | | |
| JP | 58-107289 | 7/1983 | | |
| JP | 61060289 A | 3/1986 | | |
| JP | 01048694 A | 2/1989 | | |
| JP | 04019082 A | 1/1992 | | |
| JP | 04138891 A | 5/1992 | | |
| JP | 09136286 A | 5/1997 | | |
| JP | 9234638 A | * 9/1997 | ............. | 219/121.6 |
| JP | 09248776 A | 9/1997 | | |
| JP | 10286792 A | 10/1998 | | |

* cited by examiner

Primary Examiner—Tom Dunn
(74) Attorney, Agent, or Firm—Staas & Halsey LLP

(57) ABSTRACT

A laser beam machining apparatus capable of highly accurate machining at a high speed. A parallel link mechanism including a plurality of links is fixed to a frame and a workpiece holder having moving means is provided thereunder. The links of the parallel link mechanism connect a movable member with a stationary member, and the movable member is moved with respect to the stationary member by the extending/retracting operation of the links. A laser head serving as a machining head is attached to the movable member. A supply line includes a laser transmitting optical fiber, pipes for supplying water, assist gas, etc., and an electrical signal line. A laser beam LB outputted from the laser head performs machining on a workpiece W on the workpiece holder. The supply line passes through a through hole formed inside link joint portions on the stationary member. Hollow motors for driving the links of the parallel link mechanism are mounted on the stationary member.

8 Claims, 4 Drawing Sheets

LASER BEAM MACHINING APPARATUS

BACKGROUND OF THE INVENTION

1. Field of the Invention

The present invention relates to a laser beam machining apparatus for machining materials by using a laser beam and, more particularly to a laser beam machining apparatus using a parallel link mechanism.

2. Description of Related Art

Laser beam machining apparatuses for performing machining such as cutting, boring, welding and surface treatment of a sheet-shaped material by using a laser beam have widely been employed as machining means suitable for production of a variety of products, each type being relatively small quantities, because of their advantages such as being capable of selecting machining shape freely. There are known two typical types of conventional laser beam machining apparatuses from the viewpoint of means for moving a machining head.

(1) A type of apparatus in which a machining head (laser head) is attached to an distal end of an industrial robot. In this type, the machining head is moved by the operation of the robot to thereby machine a sheet, a pipe and the like. Sometimes, a movement mechanism is additionally provided on the workpiece supporting side.

(2) A type of apparatus in which a gantry-type machine dedicated to laser beam machining is provided and a machining head is mounted at a movable end of an orthogonal movement mechanism. Sometimes, a movement mechanism is provided on the workpiece supporting side.

In the prior art of the above-described type (1), an operation range is wide and a degree of freedom of a wrist is large, so that this type of apparatus has an advantage of being suitable for machining of a three-dimensionally complex shape. However, most of robots have serially-operating constitution, so that it has a low rigidity as compared with a parallel-operating mechanism, and has a low absolute accuracy regarding the position of the machining head, which inhibits high-speed machining.

In the prior art of the above-described type (2), large-sized and heavy guides, frames, etc. are used for securing rigidity. Therefore, a high-power motor is necessary as a driving source, resulting in increase of manufacturing cost of the machine.

SUMMARY OF THE INVENTION

An object of the present invention is to provide a laser beam machining apparatus which has a higher rigidity than a laser beam machining apparatus of a conventional constitution, and therefore can easily perform high-speed driving of a machining head without decreasing the machining accuracy, and thereby efficiently perform highly accurate laser beam machining.

According to the present invention, there is provided a parallel link mechanism in which a stationary member and a movable member are connected to each other by a plurality of links, a machining head is supported on the movable member and the movable member is driven by the cooperative operation of the plurality of links to thereby move the machining head.

A feature of the laser beam machining apparatus of the present invention is that a movement mechanism for the machining head incorporates a parallel-operating driving system using the plurality of links for connecting the movable member to the stationary member. Thus, a substantial rigidity can be increased as compared with a laser beam machining apparatus of a conventional constitution using an X-Y orthogonal driving system. As a result, even if the machining head is moved at a high speed or at high acceleration, the machining accuracy is less prone to be decreased.

In a preferable mode, as means for changing a relative position of the machining head with respect to the workpiece, means for movably holding a workpiece is provided in addition to means for moving the machining head. Also, a supply line including a laser transmitting optical fiber, fluid supplying pipes and an electrical signal line is inserted through a hole formed inside a polygon formed by connecting link joint portions of the stationary member.

A hollow motor or a linear motor is preferably used as a driving source for the parallel link mechanism. In the case of hollow motor, it is preferable that an extensible axis of each link is provided through a hollow portion of the hollow motor, and the hollow motor is mounted on the stationary member using a gimbal joint.

In the case of linear motor, it is preferable that a coil and a cooling circuit are incorporated in a linear block, a magnet is incorporated in a rail and a gimbal joint is used for connecting the block with the stationary member.

DETAILED DESCRIPTION OF THE PREFERRED EMBODIMENTS

Figure 1:
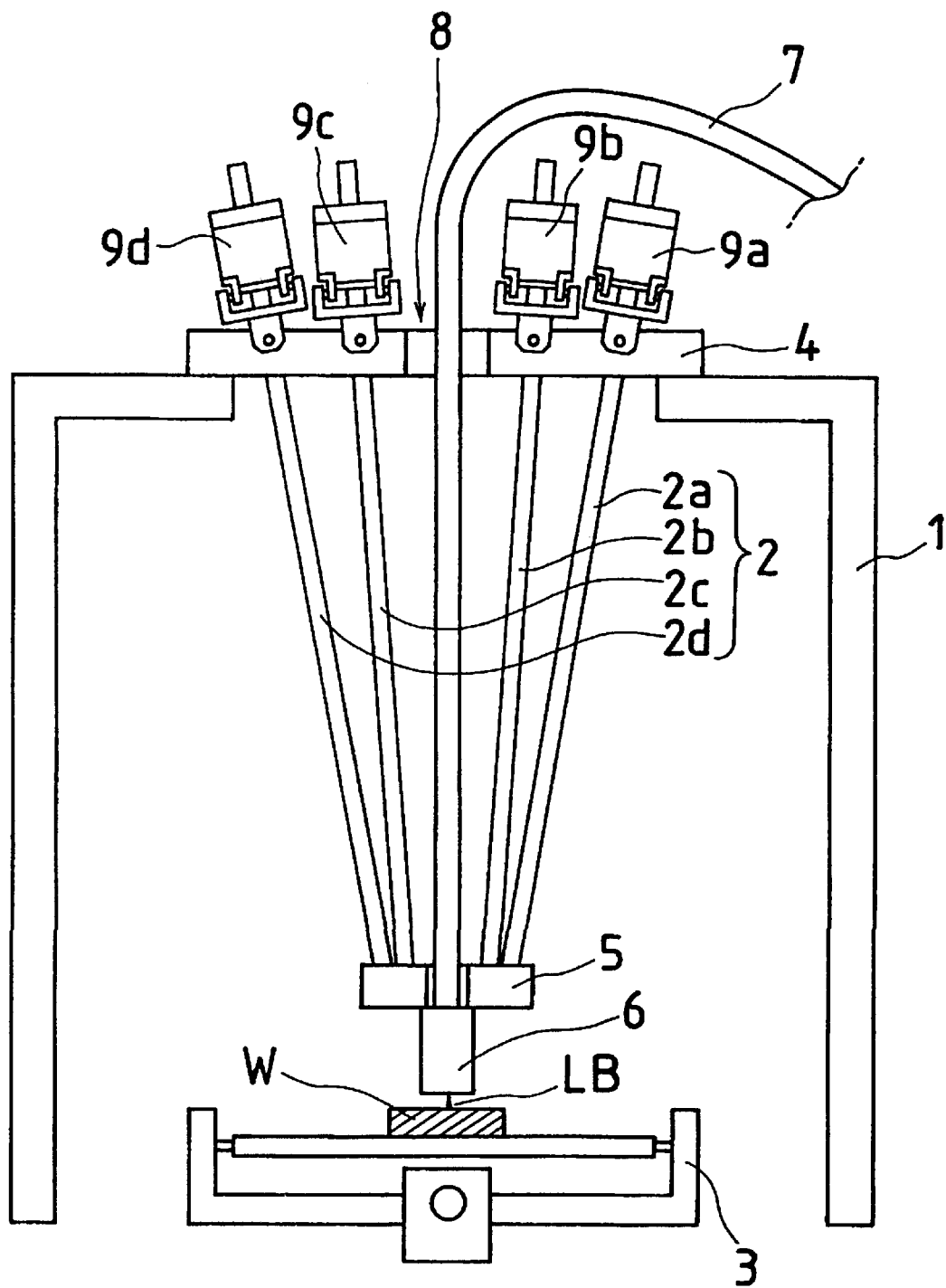
FIG. 1 is a schematic view of an essential constitution of a laser beam machining apparatus according to an embodiment of the present invention.
Figure 2:
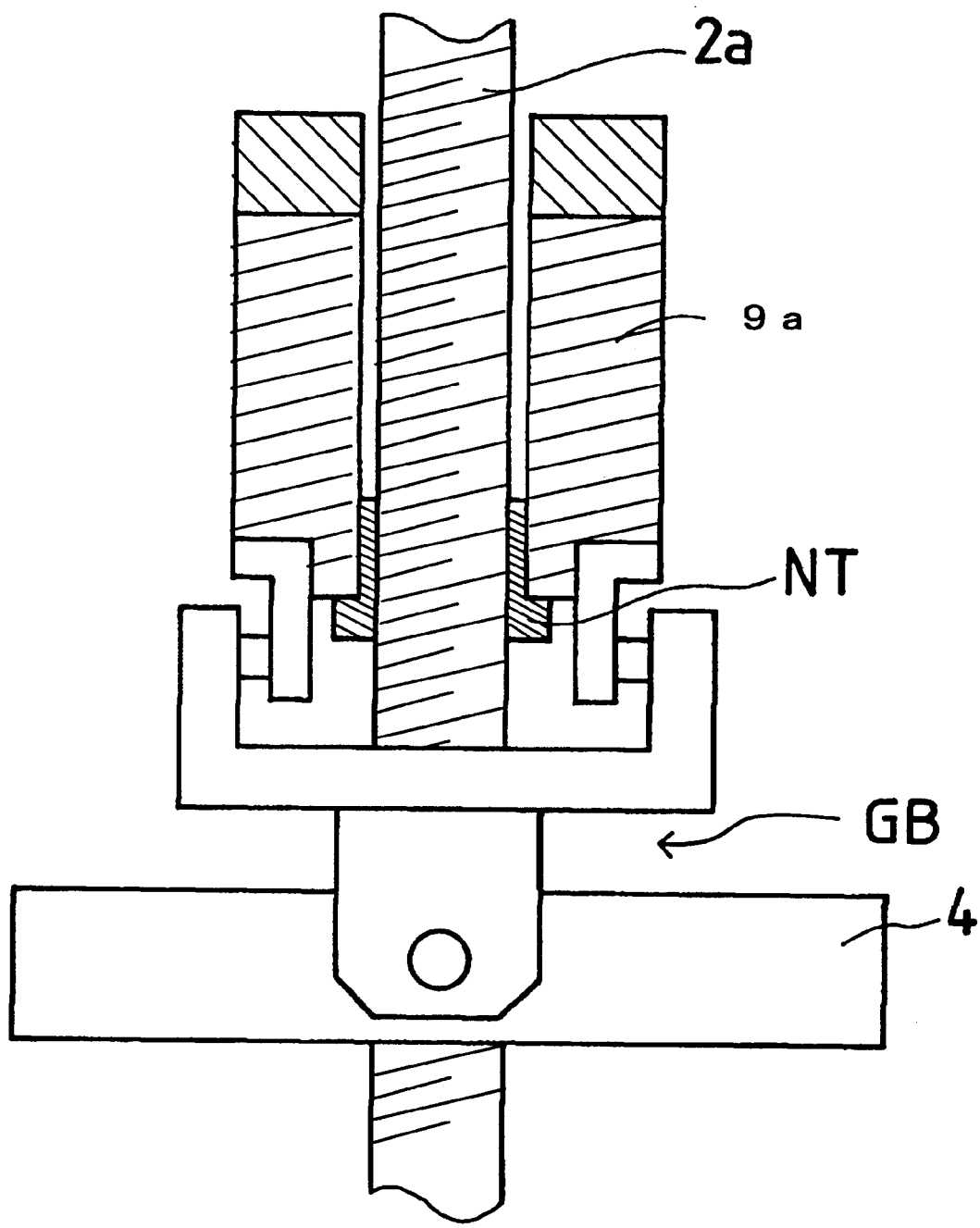
FIG. 2 is a schematic view of an example of a driving mechanism for an extensible axis adoptable in the embodiment shown in FIG. 1, as an enlarged sectional view showing the example of the extensible axis driving mechanism using a hollow motor.
Figure 3:
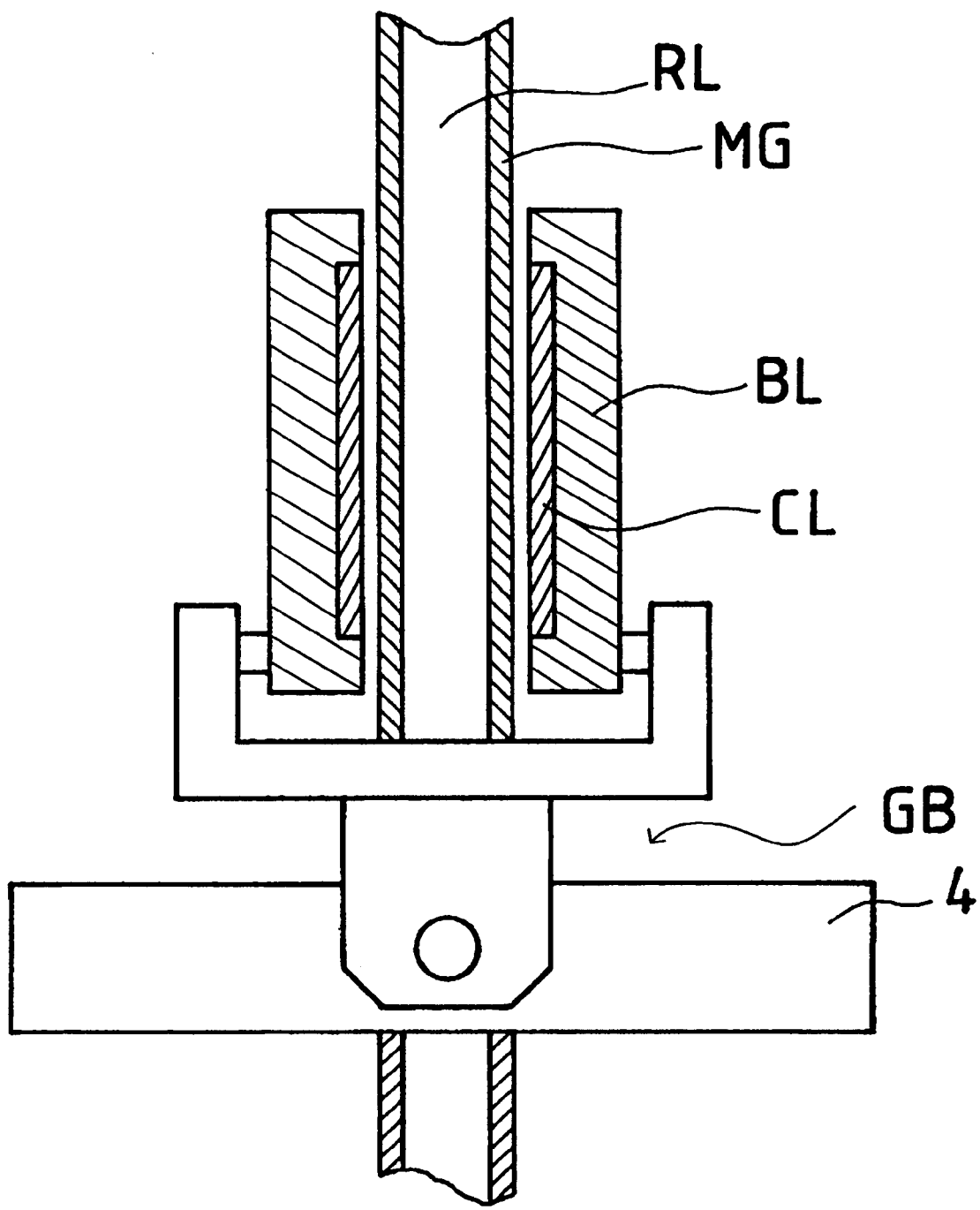
FIG. 3 is a schematic view of another example of a drive mechanism for an extensible axis adoptable in the embodiment shown in FIG. 1, as an enlarged sectional view showing the example of the extensible axis driving mechanism using a linear motor and a linear guide.

FIG. 1 is a schematic view showing an essential constitution of a laser beam machining apparatus according to an embodiment of the present invention. FIGS. 2 and 3 are schematic views of examples of a driving mechanism for an extensible shaft adoptable in the embodiment.

First, referring to FIG. 1, a parallel link mechanism 2 including a plurality of links 2a–2d is fixed to a frame denoted by reference numeral 1, and a workpiece holder 3 having moving means consisting of, for example, an XYZ table is provided under the parallel link mechanism 2. The parallel link mechanism 2 is provided so as to connect a movable member 5 to a stationary member 4, so that the movable member 5 is moved with respect to the stationary member 4 by the extending/retracting operation of the links 2a to 2d.

A laser head 6, which serves as a machining head, is attached to the movable member 5.

The laser head 6 is connected with a supply line 7 including a laser transmitting optical fiber as well as pipes for supplying necessary fluids such as water and assist gas and an electrical signal line. A laser beam LB, which is supplied from a laser oscillator (not shown) and outputted from the laser head 6 through the laser transmitting optical fiber, performs machining on a workpiece W held by the workpiece holder 3.

The supply line 7 passes through a hole formed inside a polygon formed by connecting link joint portions of the stationary member 4. Hollow motors 9 for extending/retracting the links 2a to 2d (axes of the parallel link mechanism) are mounted on the stationary member 4.

FIG. 2 is an enlarged sectional view of a hollow motor (one of the hollow motors 9a to 9d, typically showing 9a in this figure) adoptable as a driving source for the parallel link structure. As shown in FIG. 2, the link (extensible axis) 2a, which is extended/retracted by the hollow motor 9a, is inserted in a hollow portion of the hollow motor 9a. A rotational force generated by the hollow motor 9a is converted into a linear force by a ball screw/nut mechanism consisting of a ball nut NT and a ball screw formed on the link 2a, and transmitted to the link 2a to make a linear motion. The hollow motor 9a is mounted on the stationary member 4 of the parallel link mechanism 2 by means of a gimbal joint GB.

FIG. 3 is an enlarged sectional view showing another example of a drive mechanism for the link (extensible axis) 2a–2d. In this example, a linear motor is used. As shown in FIG. 3, a gimbal joint GB is provided on the stationary member 4, and a linear block BL is installed to the gimbal joint GB. A coil, cooling circuit, etc. CL for the linear motor are incorporated in the block BL, and a magnet MG is incorporated in a linear rail RL. When the coil for the linear motor is energized, the linear rail RL moves relative to the linear block BL, so that the extensible axis (2a–2d) is driven.

Like the conventional laser beam machining apparatus, the control of each part of the laser beam machining apparatus including the control of the hollow motors 9a to 9d or the linear motors is carried out by means of a controller including an NC (numerical control unit).

Figure 4:
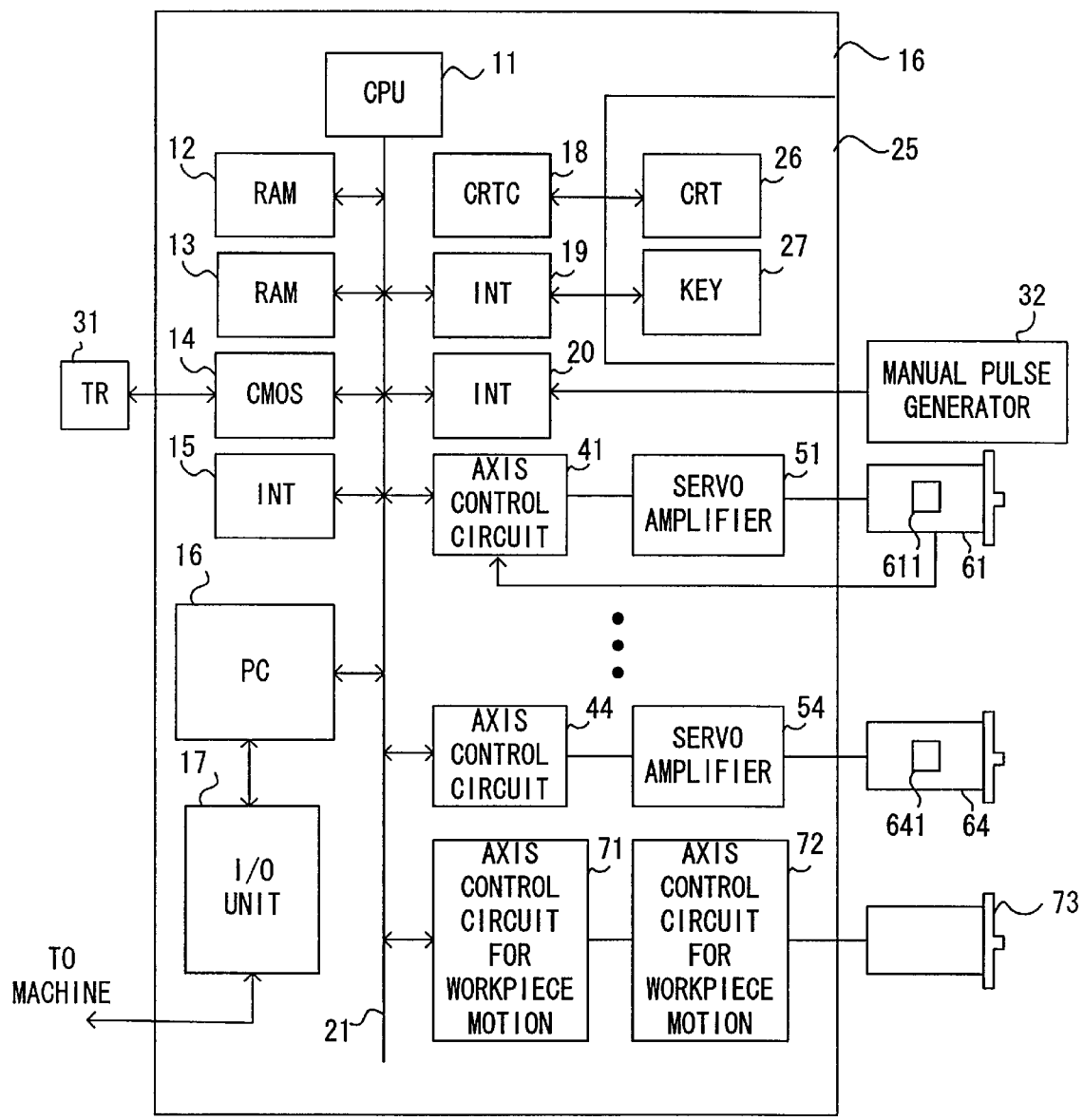
FIG. 4 is a block diagram schematically showing a hardware constitution of a controller for controlling the laser beam machining apparatus of the embodiment.

FIG. 4 is a block diagram of an essential part showing a hardware constitution of a controller for the control of the above-described laser beam machining apparatus. In FIG. 4, a controller denoted by reference numeral 10 is provided with a processor 11 for generally controlling the whole system. The processor 11 reads a system program stored in a ROM 12 via a bus 21, and control the whole controller 10 in accordance with the system program. Also, a RAM 13 in the form of DRAM temporarily stores calculation data, display data, etc.

A CMOS 14 stores a machining program and various parameters. Further, the data stored in the CMOS 14 includes parameters for specifying the relationship between the three-dimensional position of the laser head 6 and the extending/retracting positions of the extensible shafts 2a to 2d and software (a program etc.) for making conversion computation based on these paraneters.

The CMOS 14 is backed up by a battery (not shown), so that it functions as a nonvolatile memory in which the data is not erased even if the power source for the controller 10 is turned off. An interface 15, which is provided for the input from and the output to external equipment, is connected with external equipment 31 such as an off-line programming unit and a printer. When a machining program is prepared by the off-line programming unit, the data is read into the controller 10 via the interface 15. The data of the machining program edited by the controller 10 can be outputted by the printer, for example.

A PC (programmable controller) 16, which is built into the controller 10, controls the machine with a sequence program prepared in a ladder form. Specifically, the M-function, S-function, and T-function commanded by the machining program are converted into necessary signals with the sequence program, and the signals are outputted to the machine side (in this case, a machine having the above-described four axes 2a–2d) through an I/O unit 17. This output signal operates various operating parts (air cylinder, screw, electric actuator, etc.) on the machine side. Also, the PC 16 performs necessary processing by receiving a signal of various switches on the machine side and switches or the like of a machine control panel, and delivers the processed data to the processor 11.

A graphic control circuit 18 converts digital data such as the present position of each axis (2a–2d), alarm, parameter, and image data into an image signal, and outputs it. This image signal is sent to a display unit 26 of a CRT/MDI unit 25, and is displayed on the display unit 26. An interface 19 receives data from a keyboard 27 in the CRT/MDI unit 25, and delivers it to the processor 11.

An interface 20, which is connected to a manual pulse generator 32, receives pulses from the manual pulse generator 32. The manual pulse generator 32, which is mounted on the machine control panel, can be used to manually move and position movable parts of the machine body including the laser head 6.

An axis control circuit 41–44 receives a motion command of each axis from the processor 11, and outputs it to a servo amplifier 51–54. The servo amplifier 51–54 drives a motor 61–64 (the hollow motor 9a–9d or the linear motor shown in FIG. 3) based on this motion command. The motor 61–64 for each axis drives the axis 2a–2d of the machine.

Reference numeral 641 denotes a pulse coder provided as a position detector on the motor 64 for driving the extensible shaft 2a. Although not shown, the motors 62–64 for other axes are also provided with a pulse coder in the same way. The output pulses from these pulse coders are used for generating a position feedback signal and a speed feedback signal.

In the case where the workpiece holder 3 is provided with moving means such as an XYZ table, necessary numbers of driving systems including servo amplifiers and drive motors are added to drive these axes. In FIG. 4, one driving system for workpiece motion is shown by an axis control circuit 71, an amplifier 72 and a motor 73. An illustration of a well-known constitution for controlling the laser oscillator is omitted.

The laser beam machining apparatus of the present invention takes advantage of characteristics of a parallel link mechanism and has a high rigidity. The apparatus can assure high machining accuracy even when the machining head is moved at fast acceleration or at a high speed. Also, the manufacturing cost of the machine can reduced.

Further, the joints and the whole drive mechanism can be made compact by contriving the driving mechanism for the extensible axis, so that interference of the joints and the whole driving mechanism with the stationary member and the like can be lessened.

What is claimed is:

1. A laser machining apparatus comprising:
   a parallel link mechanism having a stationary member, a movable member and a plurality of links connecting said stationary member with said movable member and respectively driven by drive sources to extend/retract said plurality of links so as to move said movable member relative to said stationary member; and a machining head supported by said movable member.

2. A laser machining apparatus according to claim 1, further comprising a holding means for holding a workpiece to be movable relative to said stationary member and independently of movement of said machining head by said parallel link mechanism.

3. A laser machining apparatus according to claim 1, wherein said stationary member has a through hole formed inside a polygon connecting respective connecting points of said plurality of links to said stationary member, through which a supply line including an optical fiber for transmitting a laser beam, a fluid supply pipe and an electric signal cable passes.

4. A laser machining apparatus according to claim 1 wherein said parallel link mechanism comprises hollow motors as the drive sources and each extending/shrinking axis of said plurality of links passes through a hollow of said hollow motor and connected with said stationary member through a gimbal coupling.

5. A laser machining apparatus according to claim 1, wherein said parallel link mechanism comprises linear motors as the drive sources, each of said linear motors has a linear guide block with a coil and a cooling circuit inside and a rail with a magnet thereon, and said linear guide block is supported on said stationary member through a gimbal coupling.

6. A laser machining apparatus comprising:

a parallel link mechanism having a stationary member, a movable member and a plurality of links connecting said stationary member with said movable member and respectively driven by drive sources so as to move said movable member relative to said stationary member; and a machining head supported by said movable member, wherein said stationary member has a through hole formed inside a polygon connecting respective connecting points of said plurality of links to said stationary member, through which a supply line including an optical fiber for transmitting a laser beam, a fluid supply pipe and an electric signal cable passes.

7. A laser machining apparatus comprising:

a parallel link mechanism having a stationary member, a movable member and a plurality of links connecting said stationary member with said movable member and respectively driven by drive sources so as to move said movable member relatively to said stationary member; and a machining head supported by said movable member, wherein said parallel link mechanism comprises hollow motors as the drive sources and each extending/shrinking axis of said plurality of links passes through a hollow of said hollow motor and connected with said stationary member through a gimbal coupling.

8. A laser machining apparatus comprising:

a parallel link mechanism having a stationary member, a movable member and a plurality of links connecting said stationary member with said movable member and respectively driven by drive sources so as to move said movable member relatively to said stationary member; and a machining head supported by said movable member, wherein said parallel link mechanism comprises linear motors as the drive sources, each of said linear motors has a linear guide block with a coil and a cooling circuit inside and a rail with a magnet thereon, and said linear guide block is supported on said stationary member through a gimbal coupling.

* * * * *